United States Patent
Lee et al.

(10) Patent No.: US 9,428,117 B2
(45) Date of Patent: Aug. 30, 2016

(54) UNDER COVER APPARATUS OF REAR BUMPER MULTI-CARRIER

(71) Applicant: HYUNDAI MOTOR COMPANY, Seoul (KR)

(72) Inventors: Seung Mok Lee, Osan-si (KR); Young Sub Oh, Suwon-si (KR); Jin Young Yoon, Gimpo-si (KR); Bock Cheol Lee, Suwon-si (KR); Hyun Gyung Kim, Hwaseong-si (KR); Dong Eun Cha, Suwon-si (KR)

(73) Assignee: HYUNDAI MOTOR COMPANY, Seoul (KR)

(*) Notice: Subject to any disclaimer, the term of this patent is extended or adjusted under 35 U.S.C. 154(b) by 0 days.

(21) Appl. No.: 14/716,837

(22) Filed: May 19, 2015

(65) Prior Publication Data

US 2016/0152190 A1 Jun. 2, 2016

(30) Foreign Application Priority Data

Dec. 1, 2014 (KR) ........................ 10-2014-0169408

(51) Int. Cl.
*B60R 9/06* (2006.01)
*B60R 9/10* (2006.01)
(Continued)

(52) U.S. Cl.
CPC . *B60R 9/10* (2013.01); *B60R 9/06* (2013.01); *B60R 11/00* (2013.01); *B62D 35/02* (2013.01); *B60R 2011/0082* (2013.01); *B60R 2011/0084* (2013.01)

(58) Field of Classification Search
CPC ... B60R 9/06; B60R 9/10; B60R 2011/0084; B60R 5/041; B62D 35/02

USPC .................. 224/489, 496, 510, 518
See application file for complete search history.

(56) References Cited

U.S. PATENT DOCUMENTS

| 6,474,715 B2 * | 11/2002 | Fukushima | B60R 5/04 296/37.1 |
| 7,086,661 B1 * | 8/2006 | Osborn | B60R 9/06 150/166 |
| 7,121,597 B2 * | 10/2006 | Chuang | B60R 9/06 224/489 |

(Continued)

FOREIGN PATENT DOCUMENTS

| GB | 310775 A | * 4/1929 | ............... B60R 9/06 |
| JP | 2008-013176 A | 1/2008 | |

(Continued)

OTHER PUBLICATIONS

Korean Office Action dated Oct. 6, 2015 issued in Korean Patent Application No. 10-2014-0169408.

(Continued)

*Primary Examiner* — Justin Larson
(74) *Attorney, Agent, or Firm* — McDermott Will & Emery LLP (57) ABSTRACT

An under cover apparatus of a rear bumper multi-carrier includes a fixed rail cover coupled to a pair of fixed rails to cover a first opening part between the fixing rails. The pair of fixed rails is installed at left and right sides of a vehicle body in front and rear directions. A moving rail cover is coupled to a pair of moving rails to cover a second opening part between the moving rails. The pair of moving rails is coupled to the fixed rails to be slidable along the fixed rails, withdrawn rearward together with a rear bumper, and has the carrier coupled thereto.

10 Claims, 6 Drawing Sheets

(51) Int. Cl.
*B62D 35/02* (2006.01)
*B60R 11/00* (2006.01)

(56) References Cited

U.S. PATENT DOCUMENTS

| | | | |
|---|---|---|---|
| 7,854,358 B2 | 12/2010 | Bergerhoff et al. | |
| 8,579,361 B2 * | 11/2013 | Takeuchi | B62D 35/02 |
| | | | 296/185.1 |
| 8,827,128 B2 | 9/2014 | Degenstein et al. | |
| 9,039,263 B2 * | 5/2015 | Hofmann | B60R 9/10 |
| | | | 362/549 |
| 9,102,366 B1 * | 8/2015 | Kim | B62D 35/005 |
| 9,174,584 B1 * | 11/2015 | Cha | B60R 9/10 |
| 9,283,999 B2 * | 3/2016 | Wolf | B62D 35/007 |
| 2004/0113457 A1 * | 6/2004 | JaCquemard | B62D 35/005 |
| | | | 296/180.1 |

FOREIGN PATENT DOCUMENTS

| | | |
|---|---|---|
| JP | 2008-013177 A | 1/2008 |
| KR | 10-2008-0023518 A | 3/2008 |
| KR | 10-2013-0059621 A | 6/2013 |

OTHER PUBLICATIONS

Korean Office Action dated Mar. 25, 2016 issued in Korean Patent Application No. 10-2014-0169408.

* cited by examiner

FIG. 1

(RELATED ART)

UNDER COVER APPARATUS OF REAR BUMPER MULTI-CARRIER

CROSS REFERENCE TO RELATED APPLICATION

The present application claims the benefit of priority to Korean Patent Application No. 10-2014-0169408, filed on Dec. 1, 2014, the entire contents of which is incorporated herein for all purposes by this reference.

TECHNICAL FIELD

The present disclosure relates to an under cover apparatus of a rear bumper multi-carrier, and more particularly, to an under cover apparatus of a rear bumper multi-carrier capable of preventing pollution and damage to an object such as a bicycle loaded on the multi-carrier.

BACKGROUND

A bicycle has been widely used for leisure activity, health, and the like, and leisure vehicles (a recreational vehicle (RV), a sport utility vehicle (SUV), and the like) in which the bicycle may be loaded have gradually increased in order to transport the bicycle.

Generally, a leisure vehicle in which the bicycle can be loaded is provided with a carrier on which the bicycle can be loaded. The carrier is stored in a state which it is received in a vehicle body at an ordinary time and is withdrawn from the vehicle body to load the bicycle on the carrier as necessary.

Figure 1:
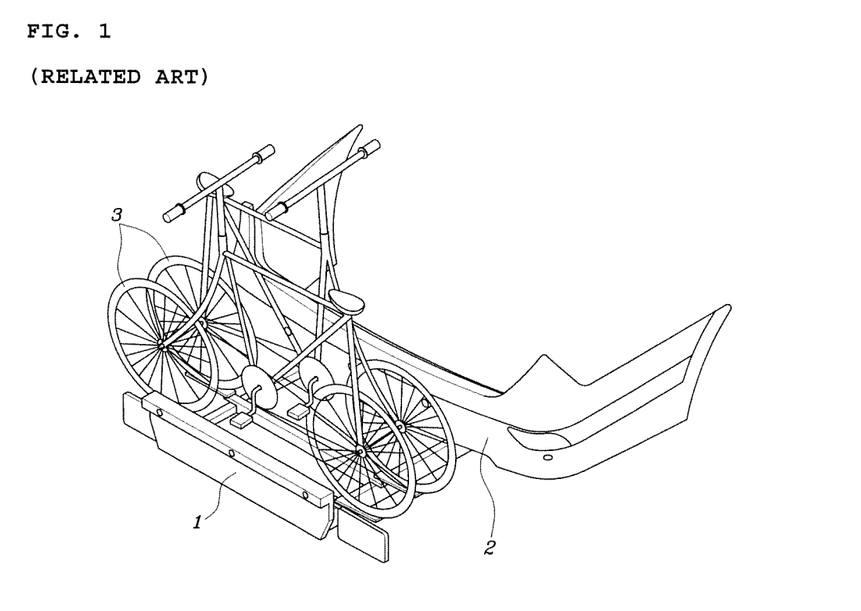
FIG. 1 is a view showing a rear bumper multi-carrier according to the related art of which a lower portion of the carrier is opened.
Figure 2:
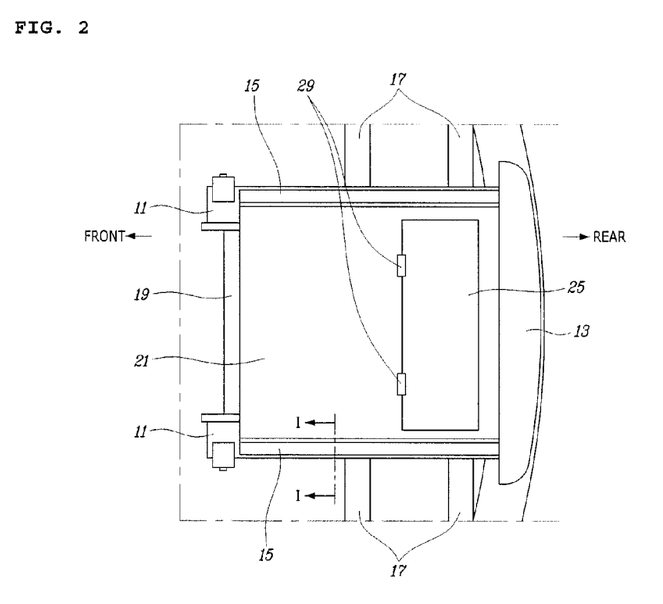
FIG. 2 is a view showing a state in which a rear bumper multi-carrier including an under cover apparatus according to an exemplary embodiment of the present inventive concept is received.

Referring to FIG. 1, a carrier 1 as described above can be withdrawn rearward from a rear bumper 2 or a luggage room, as shown in FIG. 1, in order to avoid collision with surrounding vehicles or an obstacle when a vehicle is being driven.

However, the withdrawal type carrier 1 according to the related art has a simple body frame shape, and a lower portion thereof is opened when the withdrawal type carrier 1 is withdrawn rearward of the vehicle body. Therefore, an object 3 loaded on the carrier 1 is polluted or damaged in a serious case due to dust and foreign materials from a road surface when the vehicle is being driven.

In addition, in the carrier 1 having the above frame structure in which the lower portion thereof is opened, air resistance due to a driving wind is excessively generated. Therefore, fuel efficiency is decreased, and large noise is generated.

The contents described as the related art have been provided only for assisting in the understanding for the background of the present disclosure and should not be considered as corresponding to the related art known to those skilled in the art.

SUMMARY

An aspect of the present inventive concept provides an under cover apparatus of a rear bumper multi-carrier capable of preventing pollution of and damage to an object due to dust and foreign materials from a road surface when a vehicle is being driven, improving fuel efficiency, and decreasing noise by applying the under cover to the carrier withdrawn rearward and then loading the object thereon.

Another aspect of the present inventive concept is to improve fuel efficiency through improvement of aerodynamic force by applying a deflector to an under cover.

According to an exemplary embodiment of the present inventive concept, an under cover apparatus of a rear bumper multi-carrier includes a fixed rail cover coupled to a pair of fixed rails to cover a first opening part between the fixing rails. The pair of fixed rails are installed at left and right sides of a vehicle body in a longitudinal direction. A moving rail cover is coupled to a pair of moving rails to cover a second opening part between the moving rails. The pair of moving rails are coupled to the fixed rails to be slidable along the fixed rails, withdrawn rearward together with a rear bumper, and have the carrier coupled thereto.

The under cover apparatus may further include an opening hole formed in the moving rail cover to penetrate through the moving rail cover in a vertical direction. A deflector is rotatably coupled to the moving rail cover to open and close the opening hole. A front end of the deflector is rotatably coupled to the moving rail cover through a plurality of hinges.

The moving rail cover may be overlapped with the fixed rail cover above the fixed rail cover when the carrier is inserted in an internal space at a rear lower side of a vehicle.

The under cover apparatus may further include a plurality of cover rollers installed on the fixed rail cover to rotate axially and to contact a bottom surface of the moving rail cover. The plurality of cover rollers guide sliding of the moving rail cover while supporting the moving rail cover.

The under cover apparatus may further include a plurality of deflector rollers installed on the fixed rail cover to rotate axially and to contact a bottom surface of the deflector when the carrier is inserted in an internal space at a rear lower side of a vehicle to prevent the deflector from sagging.

The deflector may close the opening hole while being arranged in a straight line form in the longitudinal direction with respect to the moving rail cover when the carrier is inserted in an internal space at a rear lower side of a vehicle and may open the opening hole while having a rear end rotating downward through the hinges when the carrier is withdrawn rearward.

The under cover apparatus may further include a deflector spring providing an elastic force to the deflector while connecting the rear end of the deflector to the moving rail cover, and maintaining a pressure of a driving wind when the vehicle is driven in a state in which the opening hole is opened to maintain the state in which the opening hole is opened.

The under cover apparatus may further include a plurality of stopper holes formed at left and right sides of the deflector. A stopper is installed in which the moving rail cover faces the stopper holes and is inserted into the stopper holes when the rear end of the deflector rotates downward, such that the opening hole is opened to restrict the rotation of the deflector to maintain a state in which the opening hole is opened.

The stopper may include a housing fixed to the moving rail cover having an opening at which it faces the stopper holes. A stopper pin moves along the housing and has a front end protruding outward of the housing and inserted into the stopper holes to restrict the rotation of the deflector. A stopper spring is installed in the housing and elastically supports the stopper pin to move the stopper pin toward the stopper holes.

The plurality of stopper holes may be formed in the vertical direction along a rotation radius of the deflector to adjust an opening angle of the deflector at multiple stages by the stopper pin.

BRIEF DESCRIPTION OF THE DRAWINGS

FIGS. 8 and 9 are views for describing a stopper according to an exemplary embodiment of the present inventive concept, wherein

DETAILED DESCRIPTION

Hereinafter, an under cover apparatus of a rear bumper multi-carrier according to an exemplary embodiment of the present inventive concept will be described with reference to the accompanying drawings.

An under cover apparatus of a rear bumper multi-carrier according to an exemplary embodiment of the present inventive concept is shown in FIGS. 2 to 9. The under cover apparatus of a rear bumper multi-carrier according to an exemplary embodiment of the present inventive concept includes a pair of fixed rails 11 installed at left and right sides of a vehicle body in front and rear directions. A pair of moving rails 15 are coupled to the fixed rails 11 to thereby slide along the fixed rails 11 and be withdrawn rearward together with a rear bumper 13. A carrier 17 is coupled to the moving rails 15.

The fixed rails 11 are fixedly installed in an internal space of a vehicle. When the moving rails 15 slide forward along the fixed rails 11, the carrier 17 is in the internal space of the vehicle. To the contrary, when the moving rails 15 are slid rearward along the fixed rails 11, the carrier 17 is in a state in which it is withdrawn rearward of the vehicle together with the rear bumper 13.

Figure 4:
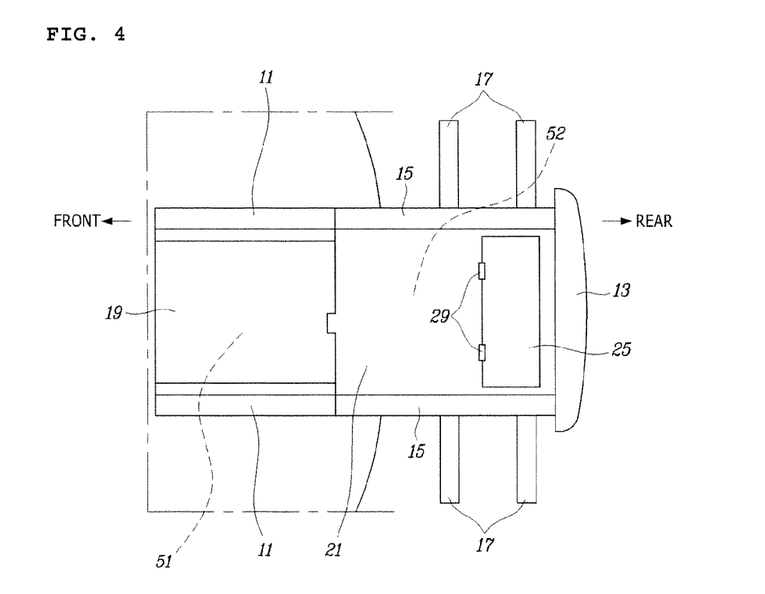
FIG. 4 is a view showing a state in which the carrier is withdrawn rearward.
Figure 5:
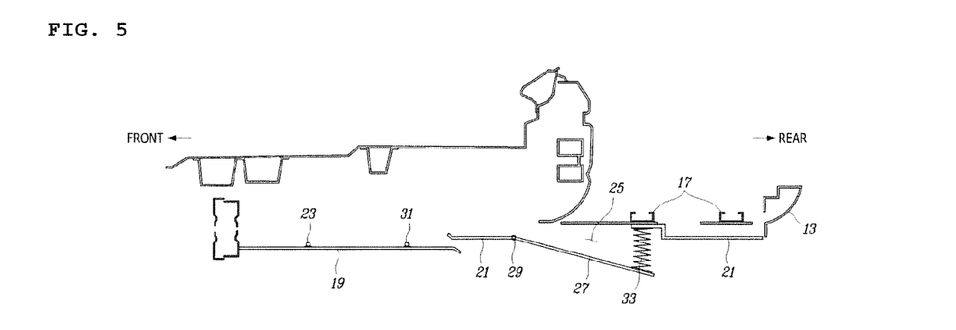
FIG. 5 is a cross-sectional view of FIG. 4.

The carrier 17 withdrawn rearward of the vehicle loads an object such as a bicycle thereon and moves the object to a target place.

Figure 6:
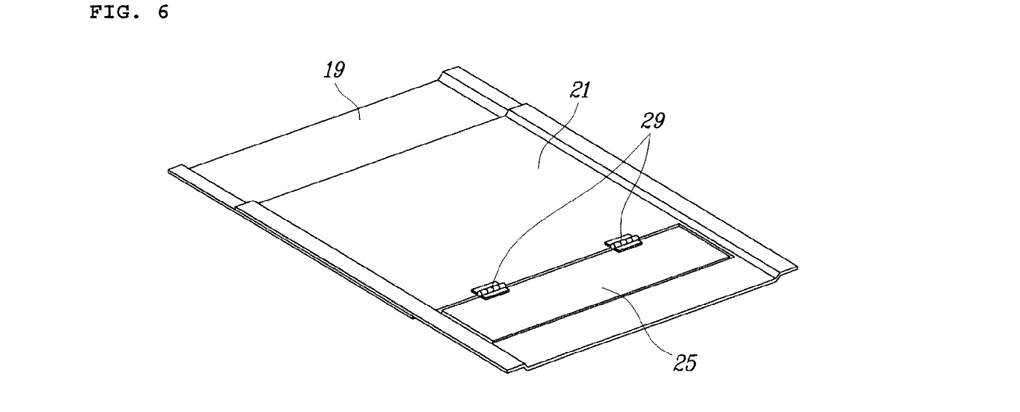
FIG. 6 is a perspective view of a moving rail cover and a fixed rail cover according to an exemplary embodiment of the present inventive concept.

The under cover apparatus of a rear bumper multi-carrier according to an exemplary embodiment of the present inventive concept includes a fixed rail cover 19 coupled to the fixed rails 11 so as to cover a first opening part 51 between the fixed rails 11. A moving rail cover 21 is coupled to the moving rails 15 so as to cover a second opening part 52 between the moving rails 15.

The moving rail cover 21 prevents pollution of and damage to the object due to dust and foreign materials from a road surface when the vehicle is driven after the object such as the vehicle is loaded on the carrier 17 withdrawn rearward and decrease air resistance due to a driving wind to improve fuel efficiency and decrease noise.

Figure 3:
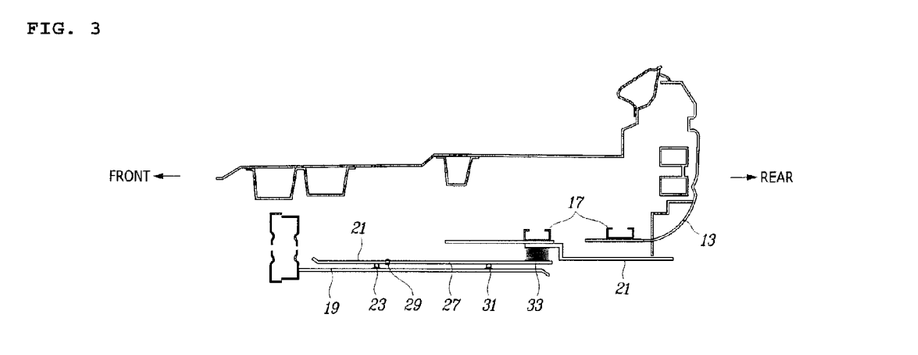
FIG. 3 is a cross-sectional view of FIG. 2.

The moving rail cover 21 is overlapped with the fixed rail cover 19 above the fixed rail cover 19 in a state in which the carrier 17 is received in the internal space of the vehicle.

Figure 7:
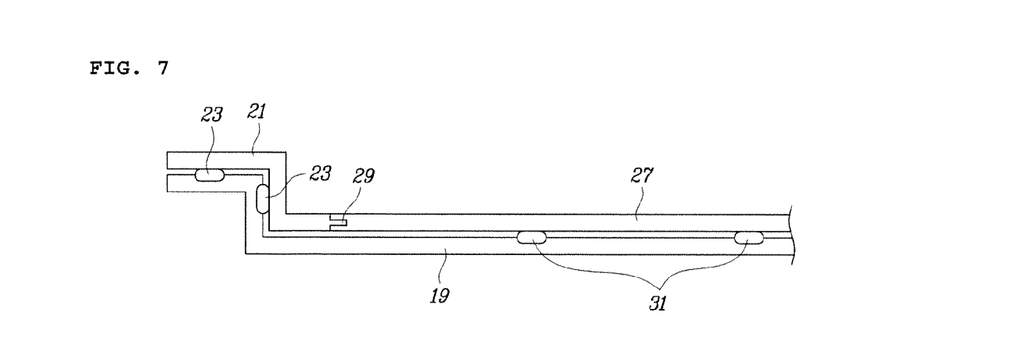
FIG. 7 is a cross-sectional view taken along line I-I of FIG. 2.

The fixed rail cover 19 has a plurality of cover rollers 23 installed thereon. The cover rollers 23 are installed on the fixed rail cover 19 so as to perform axial rotation and contact a bottom surface of the moving rail cover 21 to support the moving rail cover 21 when the moving rail cover 21 moves forward to thereby be received in the internal space of the vehicle, and rotate axially to guide movement of the moving rail cover 21 when the moving rail cover 21 slide.

In addition, the under cover apparatus of a rear bumper multi-carrier according to an exemplary embodiment of the present inventive concept further includes an opening hole 25 formed in the moving rail cover 21 to penetrate through the moving rail cover 21 in a vertical direction. A deflector 27 is rotatably coupled to the moving rail cover 21 to open and close the opening hole 25.

The deflector 27 opens the opening hole 25 of the moving rail cover 21 when the carrier 17 is withdrawn rearward, and maintains a state in which the opening hole 25 is opened when the vehicle is driven, thereby decreasing air resistance due to driving wind and improve aerodynamic force thus improving fuel efficiency.

The deflector 27 has an end portion directed forward and rotatably coupled to the moving rail cover 21 through a plurality of hinges 29. The deflector 27 closes the opening hole 25 while being arranged in a straight line form in the front and rear directions with respect to the moving rail cover 21 in a state in which the carrier 17 is received in the internal space of the vehicle and opens the opening hole 25 while having a rear end rotated downward by a self-weight through the hinges 29 in a state in which the carrier 17 is withdrawn rearward.

In addition, the under cover apparatus of a rear bumper multi-carrier according to an exemplary embodiment of the present inventive concept further includes a plurality of deflector rollers 31 installed on the fixed rail cover 19 so as to perform axial rotation.

The deflector rollers 31 contact a bottom surface of the deflector 27 in a state in which the carrier 17 is received in the internal space of the vehicle, thereby preventing a sag of the deflector 27 and support the deflector 27 to allow the deflector 27 to close the opening hole 25. When the moving rail cover 21 slides, the deflector rollers 31 rotate axially to guide the movement of the deflector 27.

In addition, the under cover apparatus of a rear bumper multi-carrier according to an exemplary embodiment of the present inventive concept further includes a deflector spring providing elastic force to the deflector 27 while connecting the rear end of the deflector 27 and the moving rail cover 21 to each other.

The deflector spring 33 allows the opening hole 25 to be opened as the rear end of the deflector 27 rotates downward and maintains pressure of the driving wind when the vehicle is driven in a state in which the opening hole 25 is opened, thereby maintaining the state in which the opening hole 25 is opened. As a result, aerodynamic force performance of the vehicle may be improved through the deflector 27.

Figure 8:
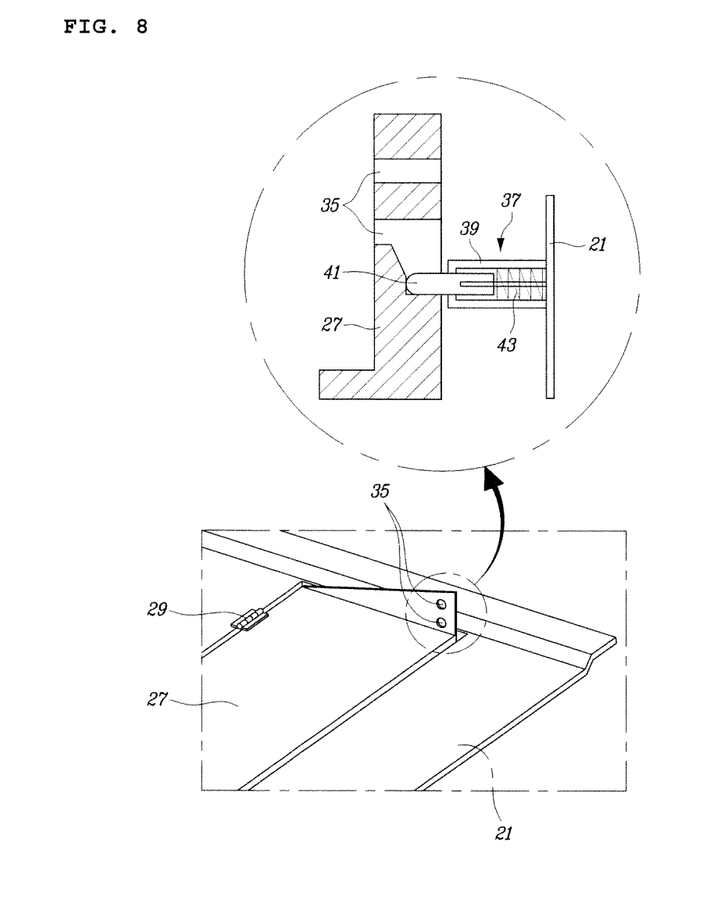
FIG. 8 is a view showing a state in which a deflector is closed.
Figure 9:
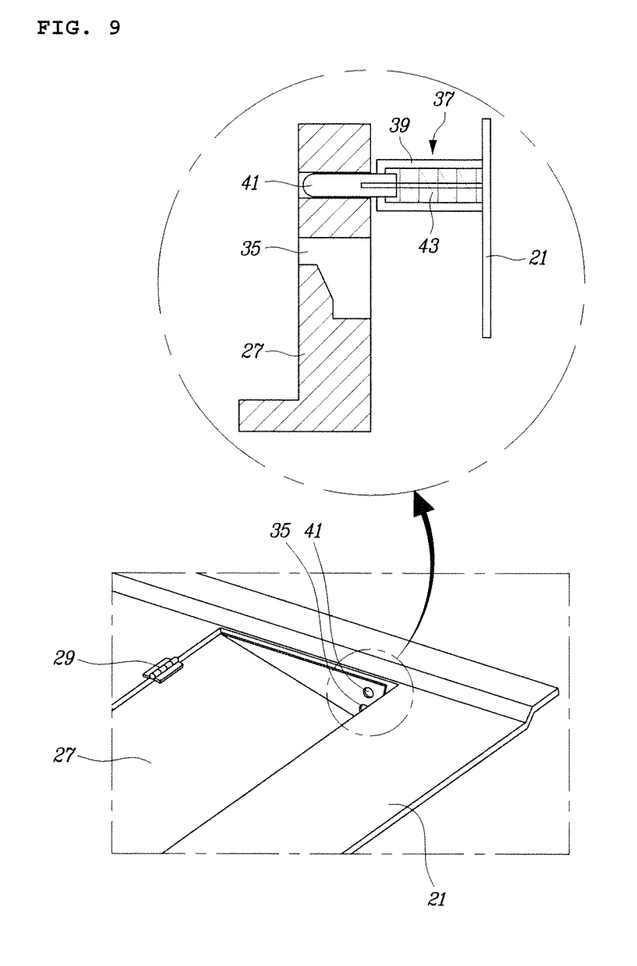
FIG. 9 is a view showing a state in which the deflector is opened.

In addition, the under cover apparatus of a rear bumper multi-carrier according to the exemplary embodiment of the present inventive concept further includes stopper holes 35 formed at left and right sides of the deflector 27. A stopper 37 is installed at a position of the moving rail cover 21 facing the stopper holes 35 and inserted into the stopper holes 35 in a state in which the rear end of the deflector 27 rotates downward, such that the opening hole 25 is opened, thereby restricting the rotation of the deflector 27 to maintain the state in which the opening hole 25 is opened.

Here, the stopper 37 includes a housing 39 fixed to the moving rail cover 21 and opened in a direction in which it faces the stopper hole 35. A stopper pin 41 moves along the housing 39 and has a front end protruding outward of the housing 39. The stopper pin 41 is inserted into the stopper hole 35 to restrict the rotation of the deflector 27. A stopper spring 43 is installed in the housing 39 and elastically supporting the stopper pin 41 so that the stopper pin 41 is movable toward the stopper hole 35.

A plurality of stopper holes 35 may be formed in the vertical direction along a rotation radius of the deflector 27 so that an opening angle of the deflector 27 may be adjusted at multiple stages by the stopper pin 41.

As set forth above, according to the present disclosure, in the rear bumper multi-carrier, a lower portion of the carrier 17 withdrawn rearward together with the rear bumper 13 may be covered using the moving rail cover 21, thereby making it possible to prevent the pollution of and the damage to the object due to the dust and the foreign materials from the road surface when the vehicle is driven after the object such as the vehicle is loaded on the carrier 17.

In addition, according the present invention, the air resistance due to the driving wind may be decreased through the moving rail cover 21, thereby making it possible to improve the fuel efficiency and decrease the noise.

Further, according to an exemplary embodiment of the present disclosure, the air resistance due to the driving wind may be decreased through the deflector 27 installed at the moving rail cover 21, thereby improving the aerodynamic force of the vehicle and fuel efficiency of the vehicle.

Although the present inventive concept has been shown and described with respect to specific exemplary embodiments, it will be obvious to those skilled in the art that the present disclosure may be variously modified and altered without departing from the spirit and scope of the present invention as defined by the following claims.

What is claimed is:

1. An under cover apparatus of a rear bumper multi-carrier, comprising:
   a fixed rail cover coupled to a pair of fixed rails to cover a first opening part between the fixing rails, the pair of fixed rails being installed at left and right sides of a vehicle body in longitudinal direction; and
   a moving rail cover coupled to a pair of moving rails to cover a second opening part between the moving rails, the pair of moving rails being coupled to the fixed rails to be slidable along the fixed rails, being withdrawn rearward together with a rear bumper, and having the carrier coupled thereto.

2. The under cover apparatus of claim 1, further comprising:
   an opening hole formed in the moving rail cover through the moving rail cover in a vertical direction; and
   a deflector rotatably coupled to the moving rail cover to open and close the opening hole,
   wherein a front end of the deflector is rotatably coupled to the moving rail cover through a plurality of hinges.

3. The under cover apparatus of claim 1, wherein the moving rail cover is overlapped with the fixed rail cover above the fixed rail cover when the carrier is inserted in an internal space at a rear lower side of a vehicle.

4. The under cover apparatus of claim 1, further comprising a plurality of cover rollers installed on the fixed rail cover to rotate axially, the plurality of cover rollers contacting a bottom surface of the moving rail cover and guiding sliding of the moving rail cover while supporting the moving rail cover.

5. The under cover apparatus of claim 2, further comprising a plurality of deflector rollers installed on the fixed rail cover to rotate axially, the plurality of deflector rollers contacting a bottom surface of the deflector when the carrier is inserted in an internal space at a rear lower side of a vehicle to prevent the deflector from sagging.

6. The under cover apparatus of claim 2, wherein the deflector closes the opening hole while being arranged in a straight line in the longitudinal direction with respect to the moving rail cover when the carrier is inserted in an internal space at a rear lower side of a vehicle and opens the opening hole while having a rear end of the deflector rotating downward by the plurality of hinges when the carrier is withdrawn rearward.

7. The under cover apparatus of claim 6, further comprising a deflector spring generating an elastic force to the deflector while connecting the rear end of the deflector to the moving rail cover, and maintaining a pressure of a driving wind when the vehicle is driven in a state in which the opening hole is opened to maintain the state in which the opening hole is opened.

8. The under cover apparatus of claim 6, further comprising:
   a plurality of stopper holes formed at left and right sides of the deflector; and
   a stopper installed in which the moving rail cover facing the stopper holes and inserted into the stopper holes when the rear end of the deflector rotates downward, such that the opening hole is opened to restrict the rotation of the deflector to maintain a state in which the opening hole is opened.

9. The under cover apparatus of claim 8, wherein the stopper includes:
   a housing fixed to the moving rail cover and having an opening at which it faces the stopper holes;
   a stopper pin moving along the housing and having a front end protruding outward of the housing and inserted into the stopper holes to restrict the rotation of the deflector; and
   a stopper spring mounted in the housing and elastically supporting the stopper pin to move the stopper pin toward the stopper holes.

10. The under cover apparatus of claim 9, wherein the plurality of stopper holes are formed in the vertical direction along a rotation radius of the deflector to adjust an opening angle of the deflector at multiple stages by the stopper pin.

* * * * *